United States Patent

Plunkett

[11] Patent Number: 6,092,810
[45] Date of Patent: Jul. 25, 2000

[54] SINGLE LAYER HEAD GASKET WITH INTEGRAL STOPPER

[75] Inventor: Tom P. Plunkett, Bolingbrook, Ill.

[73] Assignee: Dana Corporation, Toledo, Ohio

[21] Appl. No.: 09/034,784

[22] Filed: Mar. 4, 1998

[51] Int. Cl.⁷ ........................................... F16J 15/08
[52] U.S. Cl. ................................. 277/593; 277/595
[58] Field of Search .......................... 277/593, 594, 277/595

[56] References Cited

U.S. PATENT DOCUMENTS

| | | |
|---|---|---|
| 3,053,544 | 9/1962 | Gorsica . |
| 4,799,695 | 1/1989 | Yoshino . |
| 4,836,562 | 6/1989 | Yoshino . |
| 4,964,293 | 10/1990 | Inoue et al. . |
| 5,062,649 | 11/1991 | Udagawa . |
| 5,092,613 | 3/1992 | Udagawa . |
| 5,205,566 | 4/1993 | Ueta et al. . |
| 5,209,504 | 5/1993 | Udagawa et al. . |
| 5,213,345 | 5/1993 | Udagawa . |
| 5,240,261 | 8/1993 | Udagawa et al. . |
| 5,294,135 | 3/1994 | Kubouchi et al. . |
| 5,310,196 | 5/1994 | Kawaguchi et al. . |
| 5,522,604 | 6/1996 | Weiss et al. . |
| 5,588,657 | 12/1996 | Fujisawa et al. . |
| 5,695,200 | 12/1997 | Diez et al. . |
| B1 4,799,695 | 10/1991 | Yoshino . |

*Primary Examiner*—Anthony Knight
*Assistant Examiner*—John L. Beres
*Attorney, Agent, or Firm*—Rader, Fishman & Grauer PLLC

[57] ABSTRACT

A gasket for use in an internal combustion engine is disclosed which includes a sealing element formed by an extrusion and ironing process in combination with a folding operation. The gasket has a plate that includes a body portion, a flange portion and an aperture. The thickness of the flange portion is reduced to less than that of the body portion by the extrusion and ironing process. The flange portion is then folded back onto a surface of the plate in facing relation to form a stopper seal to act as a primary seal. Optional embossments may then be formed radially and outwardly of the stopper seal so as to form a secondary seal.

8 Claims, 1 Drawing Sheet

SINGLE LAYER HEAD GASKET WITH INTEGRAL STOPPER

FIELD OF THE INVENTION

The present invention relates to a gasket and more particularly to a metal cylinder head gasket used to seal the joint surfaces of a cylinder head and a cylinder lock of an engine whereby the gasket has a primary stopper seal that is formed by an extrusion process in combination with a folding operation.

BACKGROUND OF THE INVENTION

It is known to provide metallic gaskets for sealing opposed joint surfaces of a cylinder head and a cylinder block of an engine. Typical gaskets are provided with apertures which cooperate with the combustion chambers, water passages and oil passages in the engine. The apertures are further provided with some kind of sealing element.

Known sealing elements have included a separate sealing layer for the gasket, a welded on shim, or a thermal spray deposit applied to the outer surface of the gasket. Sealing elements of these types involve more materials, more assembly time, and therefore disadvantageously increase production costs.

Other known metallic gaskets include a metal plate having a substantially uniform thickness that has a portion near the apertures folded over onto the metal plate to create an increased thickness sealing surface. Such sealing elements often exhibit performance problems as the fold areas are prone to cracking due to the thickness of the metal plate.

To overcome such problems, one known gasket includes a metal plate that is provided with stepped portions such that the thickness of the plate is varied. The metal plate is folded at the portion of the plate that has a reduced cross-sectional thickness than the remainder of the plate. However, providing the stepped portions on the plate involves an extra machining step, as well as a specialized tooling set up to achieve precise tolerances, thereby serving to drive production costs upward.

Other known gaskets that have folded sealing elements utilize a metal plate with a substantially uniform thickness, but which further includes the addition of annular grooves in a surface of the metal plate. The grooves are positioned at the fold line and at that part at which the free ends of the folded portions are positioned such that the folded free ends do not come into contact with the metal plate. Gaskets of this kind also involve a separate expensive machining step to form the annular rings, thus increasing production costs.

Another known gasket only incorporates sealing beads as the sealing element on the perimeter of the gasket aperture. Sealing beads alone are unsatisfactory because significant compression is necessary to cause the beads to bear against the flanges of the cylinder head and cylinder block to create an adequate seal.

Therefore, there exists a need for a gasket having a minimum number of parts that can be manufactured cost-efficiently without sacrificing sealing effectiveness.

SUMMARY OF THE INVENTION

The present invention is directed to a metal gasket having a sealing element positioned around apertures in the gasket, such as a combustion opening, whereby the sealing element is formed by an extrusion and ironing process in combination with a folding operation.

The metallic gasket of the present invention includes a plate, preferably constructed of stainless steel for durability, having a body portion and a flange portion which encircles the perimeter of an aperture formed in the gasket. The body portion has a substantially uniform thickness. The flange portion also has a substantially uniform thickness, however, the thickness of the flange portion is less than the thickness of the body portion. The thickness of the flange portion is achieved by extruding and ironing the flange portion of the metal plate to the desired thickness without requiring specialized tooling for precise machining operations.

After extruding, the flange portion is folded forward onto the body portion in facing relationship, creating a stopper seal as a primary seal at an edge of the gasket aperture. Because of the reduced thickness of the flange portions, the seal operating thickness is advantageously only slightly larger than the plate body thickness. An optional embossment spaced radially and outwardly from the stopper seal could also be provided to serve as a secondary sealing element, thereby increasing the durability of the combustion seal area.

The gasket of the present invention has the advantage of easily controlling seal operating thickness by controlling the flange thickness without having to perform time consuming tooling set-up to achieve precise tolerances, thereby reducing production costs. By simply varying the flange thickness, the seal operating thickness can be cost-effectively varied for a wide range of gasket operating conditions.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
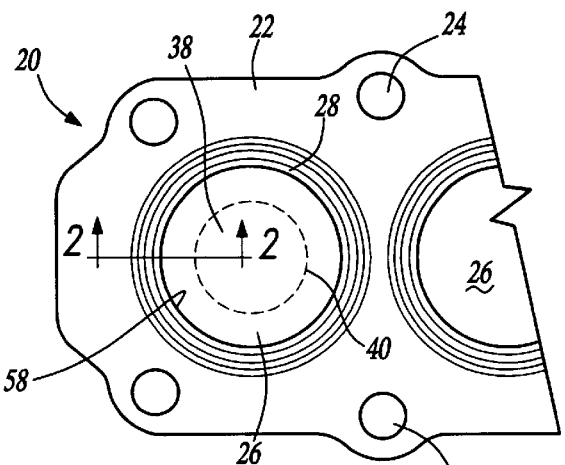
FIG. 1 is a partial plan view showing an embodiment of a gasket according to the present invention.

FIG. 1 shows a gasket 20 constructed from a single thin plate 22 of a tempered material such as fill hard SAE 301 stainless steel or springsteel. Gasket 20 has a plurality of bolt holes 24 and apertures 26 adapted to mate with combustion chambers (not shown) of an engine. Each aperture 26 is provided with a stopper seal 28 to serve as a primary combustion seal around the perimeter of each aperture 26 to provide adequate primary sealing so as to prevent gases from escaping the combustion chambers.

Figure 2:
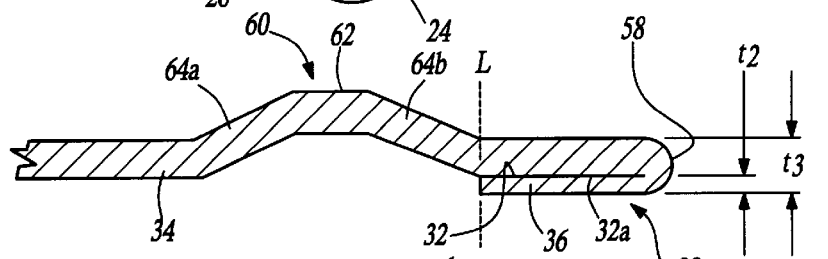
FIG. 2 is a sectional view taken along line 2—2 of FIG. 1 showing the gasket.
Figure 3A:
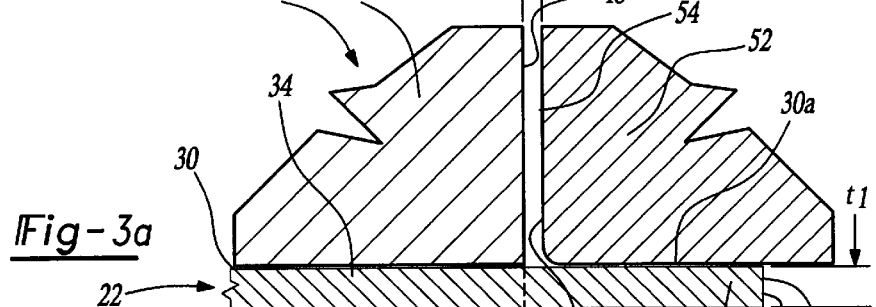
FIGS. 3a and 3b are sectional views of a die apparatus and extrusion punch press in an extrusion process for making the gasket of the present invention.
Figure 3B:
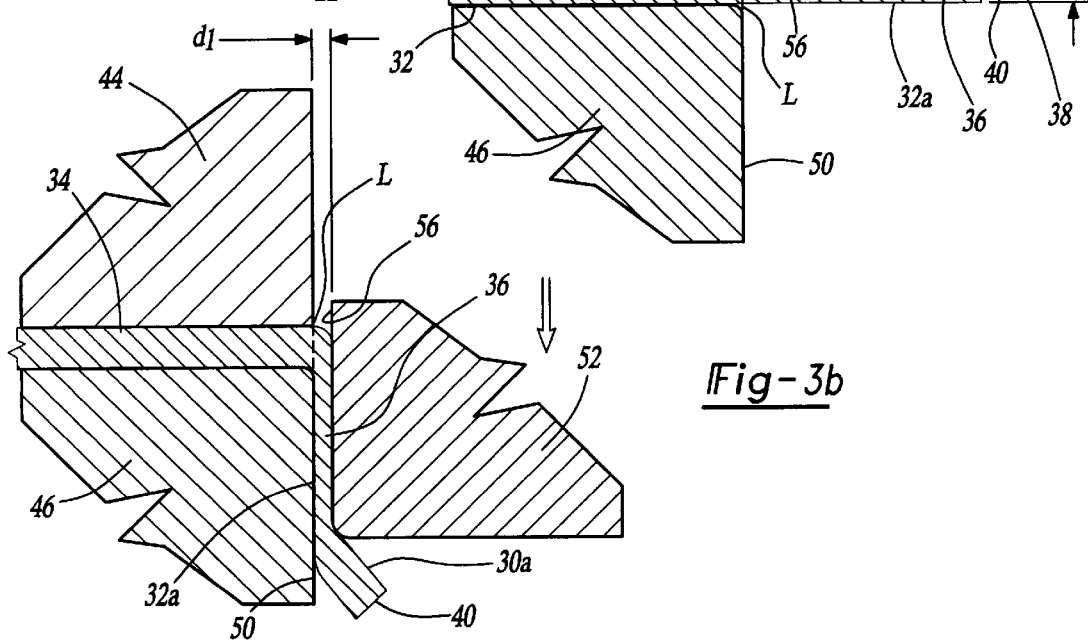

FIGS. 3a and 3b depict the process for forming stopper seal 28. The completed seal is shown in FIG. 2. Referring to FIG. 3a, plate 22 has a top surface 30 and a bottom surface 32 which define a thickness t1. Preferably, plate 22 has a thickness t1 in the range of 0.15–0.30 mm with thickness t1 being substantially uniform throughout the length of plate 22.

Plate 22 includes a body portion 34 and a flange portion 36 that encircles a perimeter of a preblanked small aperture 38, shown in phantom in FIG. 1. Small aperture 38 is defined by a flange end 40. A fold line L, spaced inwardly from flange end 40, serves to define body portion 34 and flange portion 36 of plate 22.

A die assembly 42, having an upper die 44 and a lower die 46, is provided for holding plate 22 in position during the stopper seal forming process. Body portion 34 of plate 22 is positioned within die assembly 42 so as to be sandwiched between upper die 44 and lower die 46. Fold line L is lined up with leading edges 48 and 50 of upper and lower dies 44 and 46, respectively, thereby spacing small aperture 38 away from die assembly 42. An extrusion punch press 52 is positioned above flange portion 36 and small aperture 38 of plate 22 and adjacent to upper die 44. Extrusion punch press 52 is spaced from upper die 44 a distance d1, thereby forming a gap 54 between die assembly 42 and extrusion punch press 52. Further, extrusion punch press 52 has an outer diameter that corresponds to the predetermined diameter of aperture 26.

Referring to FIG. 3b, in operation extrusion punch press 52 is moved in a downward direction to extend through small aperture 38 and contact top surface 30a of flange portion 32. The downward force of extrusion punch press 52 forces flange portion 36 to bend at fold line L such that bottom surface 32a comes into contact with leading edge 50. As extrusion punch press 52 continues downward, flange portion 36 becomes disposed within gap 54 between leading edge 50 and an outside surface 56 of extrusion punch press 52 such that flange portion 36 is extruded and ironed. Due to gap 54, flange portion 36 becomes lengthened and thinned to a thickness t2 which is equal to distance d1. Preferably thickness t2 is in the range of approximately 30–60% of the thickness of body portion 34 to provide a satisfactory operating thickness for stopper seal 28. A preferred thickness t2 is approximately 0.1–0.15 mm such that flange portion 36 is about half the thickness of body portion 34. In a preferred embodiment, extrusion punch press 52 only needs to be actuated once to achieve the reduced thickness t2 of flange portion 36, thereby providing a quick and easy cost-effective method to achieve reduced thickness t2. However, it is understood that this step may need to be repeated depending on the nature of the plate material and the original thickness t1 of plate 22.

Once flange portion 36 has been extruded and ironed to desired thickness t2, flange portion 36 is then trimmed to remove any disruptions caused by the extrusion process. Preferably the length of reduced thickness flange portion 36 is approximately 1.5–2.5 mm such that gasket is somewhat light weight to reduce costs associated with shipping and handling, but yet has enough length to produce a stopper seal with satisfactory primary sealing performance. It is understood however, that the length of reduced thickness flange portion 36 will be dependent upon the nature of the plate material and the thickness t2 of flange portion 36.

After trimming, a folding operation occurs. Flange portion 36 is folded forward toward bottom surface 32 about remnant fold line L until a bottom surface 32b of flange portion 36 abuts bottom surface 32 of body portion 34 in facing relation to form primary stopper seal 28, as shown in FIG. 2. This creates a seal thickness t3 which is slightly greater than plate 22 thickness t1. An edge 58 of primary stopper seal 28 defines the remnant of fold line L and the inner periphery for aperture 26. While bottom surface 32b of flange portion 36 is shown abutting bottom surface 32 of body portion 34, it is understood that flange portion 36 may be folded so as to abut top surface 30 in a facing relationship.

After stopper seal 28 is formed as the primary combustion seal, an optional embossment 60 or bead may be formed from body portion 34 of plate 22 by any standard beading operation. FIG. 2 shows embossment 60 having an apex 62 defined between angled legs 64a and 64b such that apex 62 extends in an upward direction from remainder of body portion 34. As illustrated, leg 64b terminates immediately adjacent to stopper seal 28 such that embossment 60 is positioned radially and outwardly from stopper seal 28 to act as a secondary combustion seal. The addition of embossment 60 is preferred to ensure increased sealing and durability of the combustion seal area around aperture 26, thereby prolonging the wear life of gasket 20. It is understood that embossment 60 may be alternatively oriented such that apex 62 extends in a downward direction.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A gasket (20), comprising:
   a metallic plate (22) having a body portion (34), a flange portion (36) and an aperture (26);
   said body portion (34) having a predetermined thickness (t1) that is substantially uniform;
   said flange portion (36) having a predetermined thickness (t2) that is less than said predetermined thickness (t1) of said body portion (34); and
   a stopper seal (28) formed by an end (40) of said flange portion (36) being folded over about a fold line (L) and onto a surface of said body portion (34) such that a surface of said flange portion (36) is abutting and in facing relation to said surface of said body portion (34), an edge (58) of said stopper seal (28) defining a remnant of said fold line (L) and the inner periphery for said aperture (26) such that said stopper seal (28) acts as a primary seal to prevent undesirable escaping of gases and fluids from said aperture (26).

2. The gasket (20) of claim 1, further including at least one embossment (60) formed from said body portion (34) of said plate (22) and positioned radially and outwardly of said stopper seal (28) so as to serve as a secondary seal for said aperture (26).

3. The gasket (20) of claim 2, wherein said embossment (60) has an apex (62) defined by legs (64), said apex (62) being oriented such that said embossment (60) extends in an upward direction relative to the remainder of said body portion (34).

4. The gasket (20) of claim 1, wherein said predetermined thickness (t2) of said flange portion (36) is approximately half of said predetermined thickness (t1) of said body portion (34).

5. The gasket (20) of claim 1, wherein said flange portion (36) is folded over about said fold line (L) such that a bottom surface (32a) of said flange portion (36) abuts in facing relation a bottom surface (32) of said body portion (34).

6. A gasket (20), comprising:
   a metallic plate (22) having a body portion (34), a flange portion (36) and an aperture (26);
   said body portion (34) having a predetermined thickness (t1) that is substantially uniform:
   said flange portion (36) being extruded so as to have a predetermined thickness (t2) that is between 30 and 60% of said predetermined thickness (t1) of said body portion (34); and
   a stopper seal (28) formed by an end (40) of said flange portion (36) being folded over about a fold line (L) and onto a surface of said body portion (34) such that a surface of said flange portion (36) is abutting and in facing relation to said surface of said body portion (34), an edge (58) of said stopper seal (28) defining a remnant of said fold line (L) and the inner periphery for said aperture (26) such that said stopper seal (28) acts as a primary seal to prevent undesirable escaping of gases and fluids from said aperture (26); and at least one embossment (60) formed from said body portion (34), wherein said embossment (60) is formed radially and outwardly of said stopper seal (28) to serve as a secondary seal.

7. The gasket (20) of claim 6, wherein said flange portion (36) is folded over about said fold line (L) such that a bottom surface (32a) of said flange portion (36) is abutting and in facing relation to a bottom surface (32) of said body portion (34) and said embossment (60) has an apex (62) defined by legs (64), said apex (62) being oriented such that said embossment (60) extends in an upward direction relative to the remainder of said body portion (34).

8. The gasket (20) of claim 6, where said predetermined thickness (t2) of said flange portion (36) is in the range of approximately 0.1–0.15 mm.

* * * * *